United States Patent
Kitade et al.

(10) Patent No.: US 12,279,543 B2
(45) Date of Patent: Apr. 22, 2025

(54) AUTOMATIC TRAVELING DEVICE

(71) Applicant: NTT DOCOMO, INC., Tokyo (JP)

(72) Inventors: Takuya Kitade, Tokyo (JP); Keisuke Yamaya, Tokyo (JP); Ryosuke Mizuno, Tokyo (JP); Takuma Matsumura, Tokyo (JP)

(*) Notice: Subject to any disclaimer, the term of this patent is extended or adjusted under 35 U.S.C. 154(b) by 181 days.

(21) Appl. No.: 18/005,445

(22) PCT Filed: Mar. 8, 2022

(86) PCT No.: PCT/JP2022/009994
§ 371 (c)(1),
(2) Date: Jan. 13, 2023

(87) PCT Pub. No.: WO2022/215416
PCT Pub. Date: Oct. 13, 2022

(65) Prior Publication Data
US 2023/0276727 A1    Sep. 7, 2023

(30) Foreign Application Priority Data

Apr. 5, 2021 (JP) ................ 2021-064000

(51) Int. Cl.
*A01B 69/00* (2006.01)
*A01B 69/04* (2006.01)
*G05D 1/00* (2006.01)

(52) U.S. Cl.
CPC .......... *A01B 69/008* (2013.01); *A01B 69/001* (2013.01); *G05D 1/0219* (2013.01)

(58) Field of Classification Search
CPC .................................................. A01B 69/008
See application file for complete search history.

(56) References Cited

U.S. PATENT DOCUMENTS 10,775,804 B1 * 9/2020 Eade ................... G05D 1/0253
2003/0235327 A1 * 12/2003 Srinivasa ............. G06V 10/255
382/104
(Continued)

FOREIGN PATENT DOCUMENTS

CN    112668421 A *  4/2021
JP    H2-029205        2/1990
(Continued)

OTHER PUBLICATIONS

International Search Report dated May 24, 2022 for PCT/JP2022/009994.
(Continued)

*Primary Examiner* — Shelley Chen
(74) *Attorney, Agent, or Firm* — SOEI PATENT & LAW FIRM

(57) ABSTRACT

To provide an automatic traveling device capable of automatically traveling along a desired route without performing positioning.

An automatic traveling device 100 is a device that performs predetermined work on crops S which are detection targets arranged in its traveling direction. A camera 101 acquires image data by capturing an image of the crops S in the traveling direction of the automatic traveling device 100. The recognition unit 102 disposes a plurality of determination windows (such as determination windows 1L and 1R) at positions determined in advance with respect to the image data, and recognizes the crops S in the plurality of determination windows 1R and the like. The adjustment unit 104 adjusts the traveling direction of the automatic traveling device 100 on the basis of a result of recognition performed by the recognition unit 102.

20 Claims, 15 Drawing Sheets

(56) References Cited

U.S. PATENT DOCUMENTS

2021/0149406 A1* 5/2021 Javault ................. A01C 21/005
2023/0196585 A1* 6/2023 Nachum ................... G06T 3/40
                                                              382/103

FOREIGN PATENT DOCUMENTS

| JP | 2015-146748 | | | 8/2015 | |
| JP | 2015146748 A | * | | 8/2015 | |
| JP | 2016-162172 | | | 9/2016 | |
| JP | 2016162172 A | * | | 9/2016 | |
| JP | 2019-067018 | | | 4/2019 | |
| JP | 2019-115309 | | | 7/2019 | |
| WO | WO-2019088223 A1 | * | 5/2019 | ............. | G06Q 30/06 |

OTHER PUBLICATIONS

International Preliminary Report on Patentability with Written Opinion dated Oct. 19, 2023 for PCT/JP2022/009994.

* cited by examiner

AUTOMATIC TRAVELING DEVICE

CROSS-REFERENCE TO RELATED APPLICATIONS

This application is a 35 U.S.C. § 371 national phase application of PCT/JP2022/009994, filed on Mar. 8, 2022, which claims priority to Japanese Patent Application No. 2021-064000, filed on Apr. 5, 2021.

TECHNICAL FIELD

The present invention relates to an automatic traveling device that travels automatically.

BACKGROUND ART

Patent Literature 1 describes that the direction of a work vehicle is detected, and in a case where the direction of the body of the vehicle detected by a direction detection member and a set travel route differ from each other by a predetermined value or more, a steering member is steered toward the set travel route of the work vehicle.

CITATION LIST

Patent Literature

[Patent Literature 1] Japanese Unexamined Patent Publication No. 2019-115309

SUMMARY OF INVENTION

Technical Problem

However, in the invention disclosed in Patent Literature 1, GPS is used to determine the deviation of the travel route of a traveling vehicle. Therefore, a positioning unit such as a GPS unit is required, which leads to complication of its configuration and an increase in cost.

Consequently, in order to solve the above-described problem, an object of the present invention is to provide an automatic traveling device capable of automatically traveling along a desired route without performing positioning.

Solution to Problem

According to the present invention, there is provided an automatic traveling device configured to perform predetermined work on detection targets arranged in its traveling direction, including: an acquisition unit configured to acquire image data by capturing an image of a detection target in the traveling direction of the automatic traveling device; a recognition unit configured to dispose a plurality of determination windows at positions determined in advance with respect to the image data and recognize the detection target in the plurality of determination windows; and an adjustment unit configured to adjust the traveling direction of the automatic traveling device on the basis of a result of recognition performed by the recognition unit, wherein the plurality of determination windows are disposed to be shifted from each other along the traveling route of the automatic traveling device in accordance with an imaging range of a camera that captures an image of the detection target.

Advantageous Effects of Invention

According to the present invention, it is possible to perform automatic traveling along the arrangement of detection targets without performing positioning or the like.

DESCRIPTION OF EMBODIMENTS

Figure 1:
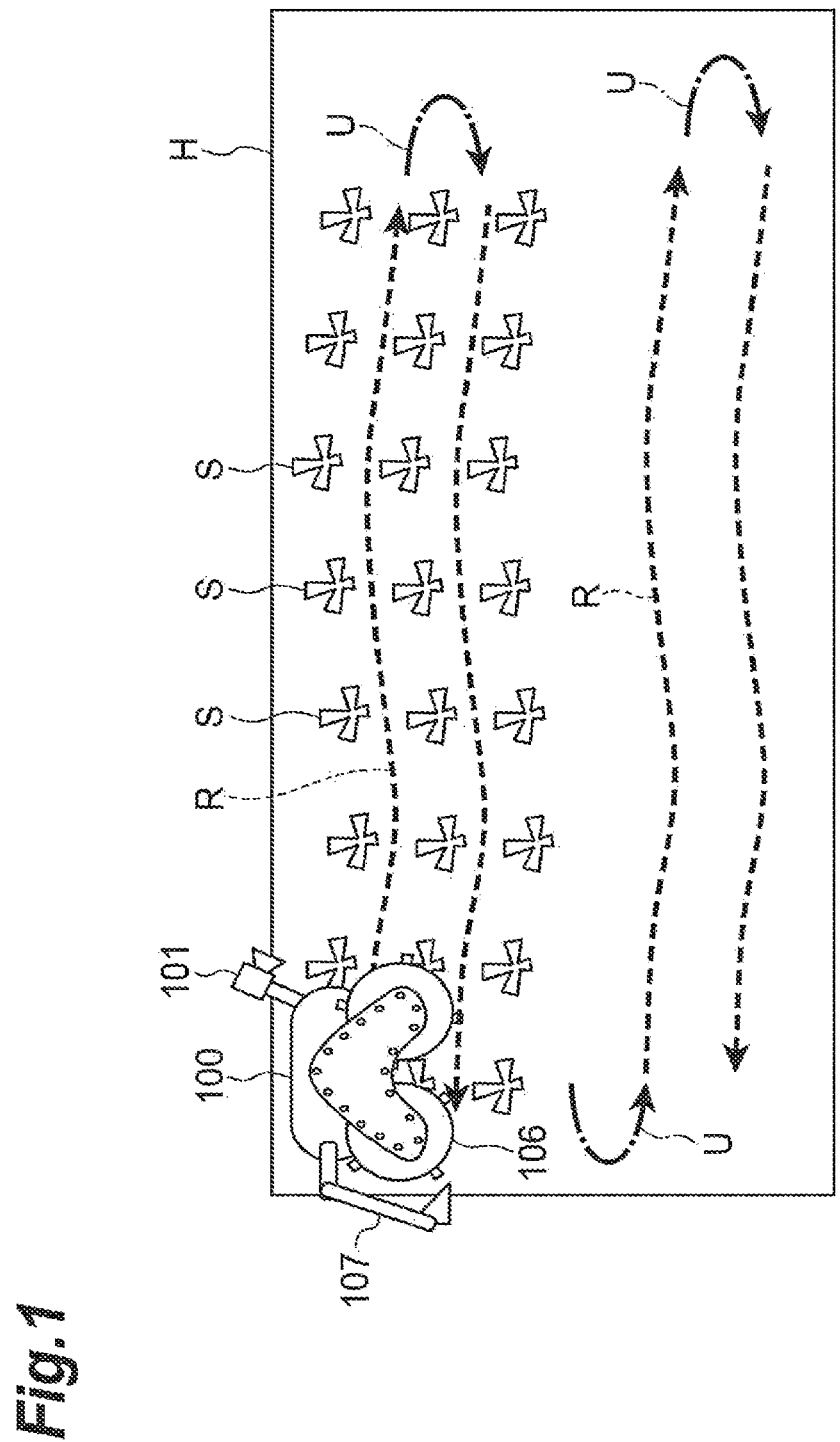
FIG. 1 is a schematic diagram of a case in which an automatic traveling device 100 of the present disclosure travels through a farm field H.

An embodiment of the present disclosure will be described with reference to the accompanying drawings. The same components are denoted, if possible, by the same reference numerals and signs, and thus description thereof will not be repeated.

FIG. 1 is a schematic diagram of a case in which an automatic traveling device 100 of the present disclosure travels through a farm field H. As shown in FIG. 1, the automatic traveling device 100 recognizes the arrangement of crops S planted in the farm field H and travels along a traveling route R according to the arrangement. The automatic traveling device 100 makes a U-turn at the end of the farm field H and travels through the entire farm field H.

The automatic traveling device 100 includes a camera 101 and recognizes the arrangement of the crops S on the basis of image data captured by the camera 101. The automatic traveling device 100 includes a wheel driving mechanism 106 and a working unit 107. The working unit 107 is, for example, a weeding mechanism. The automatic traveling device 100 removes weeds or the like other than the crops S by traveling through the farm field H. The weeding mechanism is an example, and the working unit 107 may be configured to perform other work mechanisms.

Figure 2:
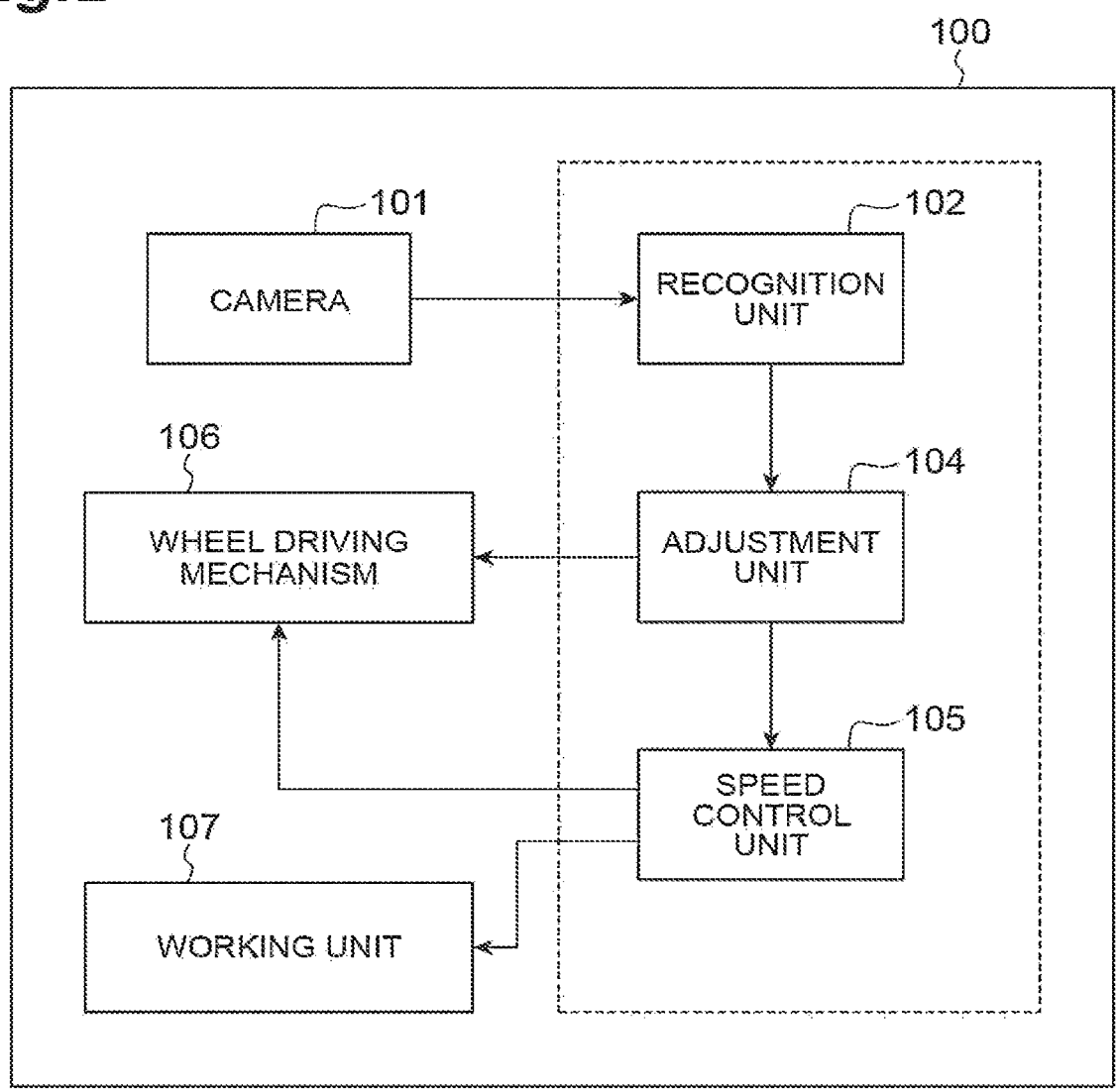
FIG. 2 is a block diagram illustrating a functional configuration of the automatic traveling device 100.

FIG. 2 is a block diagram illustrating a functional configuration of the automatic traveling device 100. As shown in the drawing, the automatic traveling device 100 is configured to include the camera 101, a recognition unit 102, an adjustment unit 104, a speed control unit 105, the wheel driving mechanism 106, and the working unit 107.

The camera 101 is a portion which is disposed in the traveling direction of the automatic traveling device 100 to capture an image of crops or the like arranged in the traveling direction and acquire still image data thereof, and functions as an acquisition unit that acquires image data. The camera 101 may capture a moving image and extract still image data from moving image data, or may capture a still image for each predetermined period.

The recognition unit 102 is a portion that superimposes a region of interest (ROI: determination window) on a predetermined position in full-screen image data including an image of a detection target (for example, crops in a farm field) captured by the camera 101 and recognizes a predetermined detection target through the determination window. Hereinafter, the ROI is referred to as a determination window. In the present disclosure, the recognition unit 102 recognizes soil, crops, weeds, and the like as detection targets, and classifies the detection targets. In a recognition process, a deep neural network (DNN) algorithm such as image classification is used, but any other image classification algorithm may be used.

The adjustment unit 104 is a portion that adjusts the deviation of the traveling direction of the automatic traveling device 100 with respect to the arrangement of detection targets on the basis of the recognition result recognized by the recognition unit 102.

The speed control unit 105 is a portion that controls the speed of the automatic traveling device 100. The speed control unit 105 controls the speed of the automatic traveling device 100 when the adjustment unit 104 adjusts the deviation of the traveling direction, when the automatic traveling device makes a U-turn, or as otherwise necessary.

The wheel driving mechanism 106 is a mechanism portion of the automatic traveling device 100. The wheel driving mechanism 106 includes a mechanism for traveling at a speed controlled by the adjustment unit 104 and a mechanism for traveling in a direction according to the traveling direction controlled by the adjustment unit 104. Although there are other mechanisms in the automatic traveling device 100, they are omitted here.

The working unit 107 is a portion that performs a weeding process in accordance with the traveling of the automatic traveling device 100. The working unit 107 includes a claw-shaped instrument, and performs weeding by dragging the claw-shaped instrument as the automatic traveling device 100 travels. Meanwhile, without being limited to this, it may also be a mechanism for additional fertilizing work and pesticide spraying. In addition, a robot arm may be provided to thin out and harvest crops. In addition, a camera (for a different purpose from that of the camera 101) may be provided to capture an image of passing crops, thereby making it possible to predict the yield and determine the incidence of pests.

Figure 3:
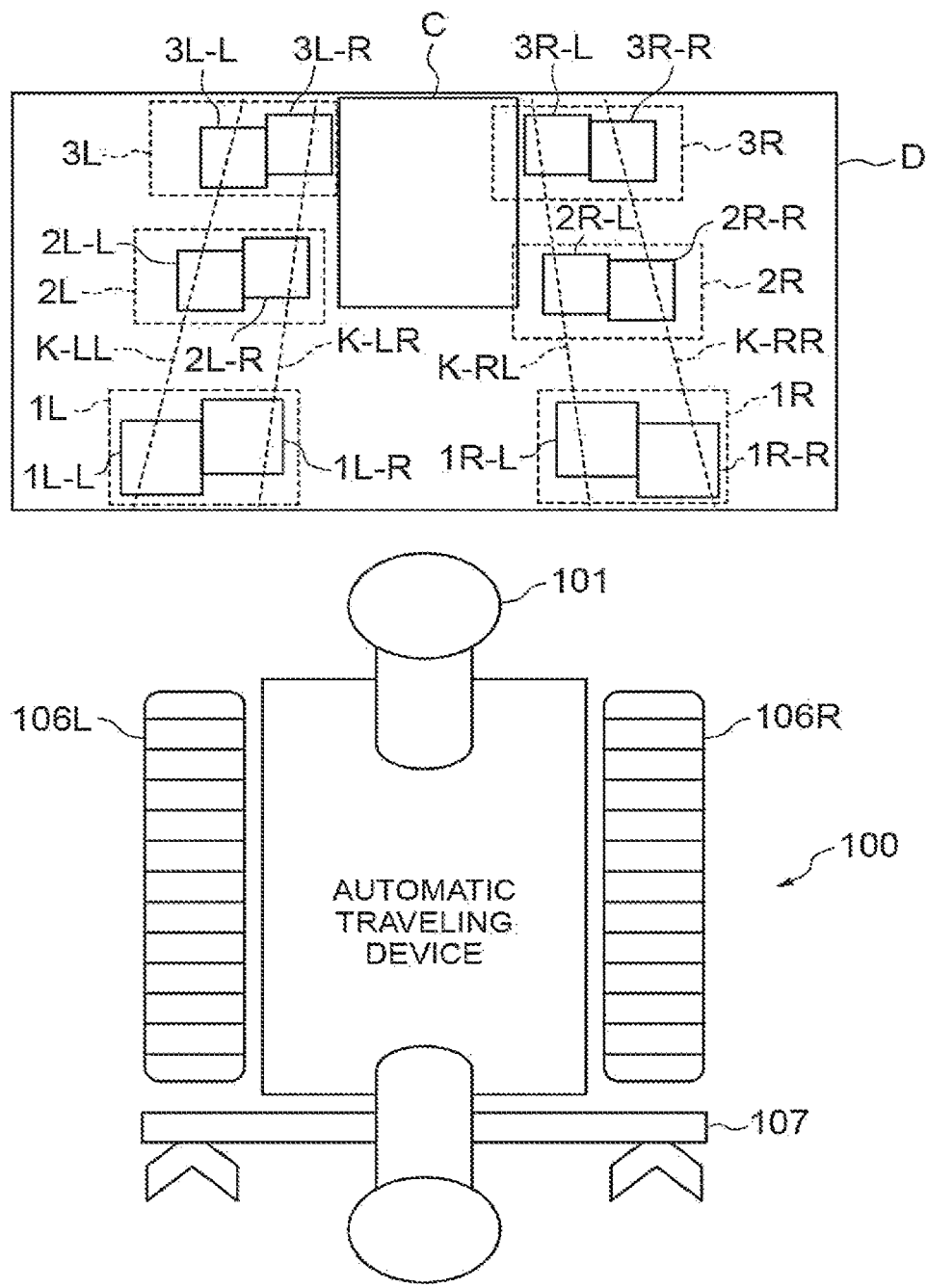
FIG. 3 is a schematic diagram illustrating the automatic traveling device 100 and full-screen image data D captured by the automatic traveling device 100.

Here, processing content of the recognition unit 102 will be described. FIG. 3 is a schematic diagram illustrating the automatic traveling device 100 and full-screen image data D captured by the automatic traveling device 100 (the camera 101). As shown in the drawing, perspective transformation is not performed on the full-screen image data D. In the full-screen image data D, determination window sets 1L to 3L, determination window sets 1R to 3R, and an end determination window C are disposed. The determination window set 1L is configured with two right and left determination windows 1L-L and 1L-R as one set. The same applies to the other determination window sets 2L and 3L and the determination window sets 1R to 3R.

The full-screen image data D indicates image data captured by the camera 101. The determination window sets 1L to 3L, the determination window sets 1R to 3R, and the end determination window C are portions recognized by the recognition unit 102. The recognition unit 102 performs an image recognition process on detection targets included in these determination windows.

In addition, reference lines K (reference lines K-LL to K-RR) are indicated in the full-screen image data D. They will be referred to as the reference lines K unless otherwise specified. The reference lines K indicate the track prediction of the wheel driving mechanism 106. For example, they indicate that the wheel driving mechanism 106L is scheduled to pass between the reference line K-LR and the reference line K-LL.

The determination window sets 1L to 3L and the determination window sets 1R to 3R are disposed along the reference lines K.

The determination windows 1L-L to 3R-R are formed smaller toward the upper part of the full-screen image data D. For example, the size of each determination window has a relation of the determination window 1L-L> the determination window 2L-L> the determination window 3L-L. The same applies to the other determination window 1L-R and the like. The lower part of the full-screen image data D indicates an area close to the automatic traveling device 100 in the traveling direction, the upper part of the full-screen image data D indicates an area far from the automatic traveling device 100 in the traveling direction, and the track of the automatic traveling device 100 narrows toward the upper part of the full-screen image data D. Therefore, it is necessary to reduce the sizes of the determination windows and arrange them.

As described above, the determination window sets 1L to 3L and the determination window sets 1R to 3R are configured with two determination windows as one set. For example, the determination window set 1L is composed of the determination window 1L-L and the determination window 1L-R. Meanwhile, it may be configured with three or more determination windows as one set. In addition, in the example of FIG. 3, two determination window sets 2L and 2R are disposed between the determination window sets 1L and 1R and the determination window sets 3L and 3R, but a number of determination window set along the reference lines K may be increased to improve the robustness of recognition, such as by further providing another determination window set between the determination window sets 1L and 2L.

Each of the right and left determination windows is disposed to be shifted (out of alignment from each other, offset) along the inclination of the reference line K. For example, in a case where the reference line K is inclined to the right, determination windows disposed on the right are disposed to be shifted upward. In FIG. 3, the reference lines K-LL and K-LR are inclined to the right (to the center side of the full-screen image data D), and thus the determination window 1L-R is disposed to be shifted upward from the determination window 1L-L in accordance with its inclination. The determination window 1L-L and the determination window 1L-R are adjacent/close to/abut/located next to each other, but need not to be close to each other. The determination window 1L-L and the determination window 1L-R may be in a proximate positional relationship.

The end determination window C is disposed at the upper center of the full-screen image data D. The end determination window C is formed to be larger than the other determination window 1L-L and the like. In the present disclosure, the end determination window is disposed between the determination window 3L-R and the determination window 3R-L. Meanwhile, the end determination window C may be formed to be large enough to overlap each of the determination window 3L-R and the determination window 3R-L.

The inclination of each reference line K and the arrangement of the determination window sets 1L to 3R are set in advance on the basis of the imaging range of the camera 101 (that is, the imaging direction and its angle of view). The camera 101 is disposed in the traveling direction and disposed to be inclined slightly downward (for example, about 30 degrees). The imaging range of the camera 101 is determined in accordance with the imaging direction and its angle of view. Meanwhile, the reference lines K and the arrangement of the determination window sets 1L to 3R may be determined on the basis of either the imaging direction or its angle of view.

Each of the determination window sets 1L to 3R arranged in this way is a window for determining the presence or absence of the crops S on the track so that the wheel driving mechanisms 106L and 106R do not trample the crops S. In addition, the end determination window C is a window for determining whether the automatic traveling device 100 has reached the end of the farm field H when traveling through the farm field.

Figure 4:
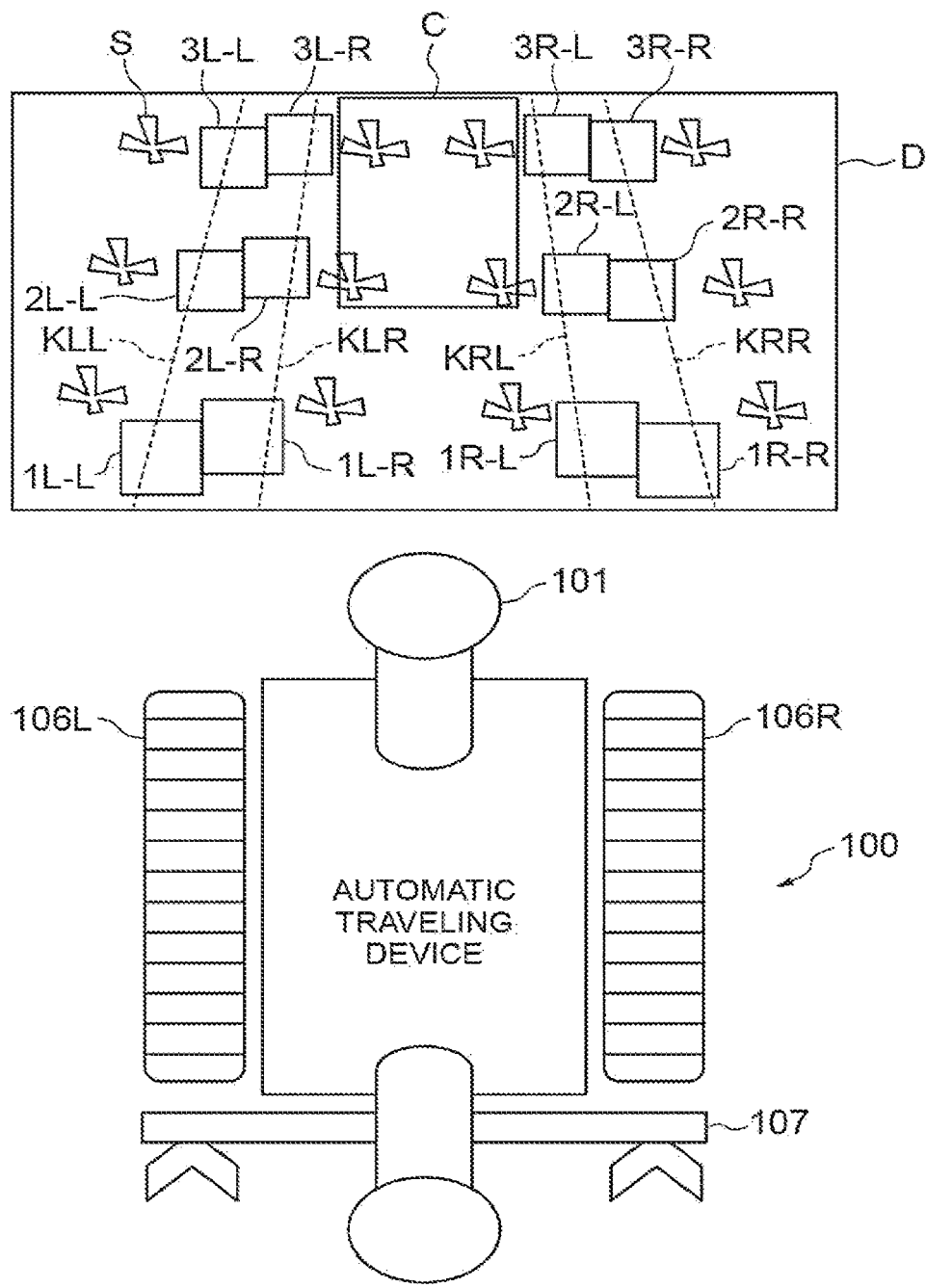
FIG. 4 shows a schematic diagram in which determination windows 1L-LL to 3R-RR, an end determination window C, and reference lines K are superimposed on the full-screen image data D including crops S which are detection targets.

Next, a determination process using these determination windows 1L-L to 3R-R and the end determination window C and the operation of the automatic traveling device 100 will be described. FIG. 4 shows a schematic diagram in which the determination windows 1L-L to 3R-R, the end determination window C, and the reference lines K are superimposed on the full-screen image data D including the crops S which are detection targets. In FIG. 4, the crops S do not overlap the determination window sets 1L to 3R, and the recognition unit 102 does not recognize the crops S in the determination windows 1L-LL to 3R-RR. In addition, the crops S overlap the end determination window C, and the recognition unit 102 recognizes the crops S in the end determination window C. Therefore, the adjustment unit 104 determines that the automatic traveling device 100 has not traveled along the track where the crops S are trampled and has not reached the end of the farm field H, and continues to travel without performing an adjustment process.

Figure 5:
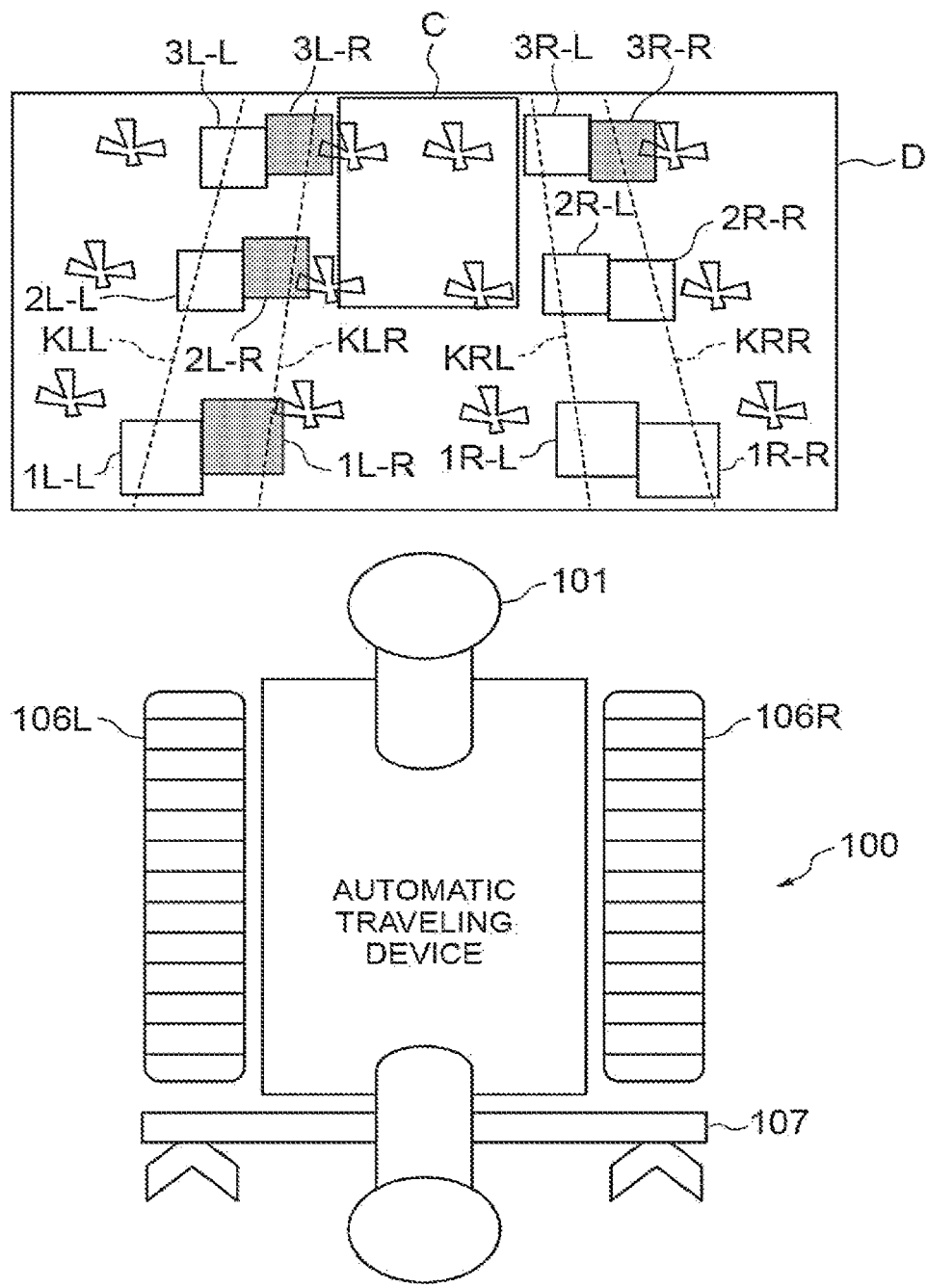
FIG. 5 is a schematic diagram illustrating image data in which the wheels of the automatic traveling device 100 are on a track where the crops S are trampled.

FIG. 5 is a schematic diagram illustrating image data in which the wheels of the automatic traveling device 100 are on the track where the crops S are trampled. As shown in the drawing, the crops S overlap the determination windows 1L-R, 2L-R, 3L-R, and 3R-R. On the other hand, the crops S are included in the end determination window C. The recognition unit 102 recognizes that the crops S overlap the determination windows 1L-R, 2L-R, 3L-R, and 3R-R and that the crops S are included in the end determination window C.

The adjustment unit 104 performs control for changing the right and left steering of the wheel driving mechanism 106 on the basis of the number of determination windows 1L-L and the like in which the recognition unit 102 recognizes that there are the crops S. In the drawing, since the crops S are included in the right determination window 3L-R and the like, the adjustment unit 104 determines that the automatic traveling device 100 is turning to the right, and controls the wheel driving mechanism 106 so that the automatic traveling device rotates in the left direction in order to solve this.

Figure 6:
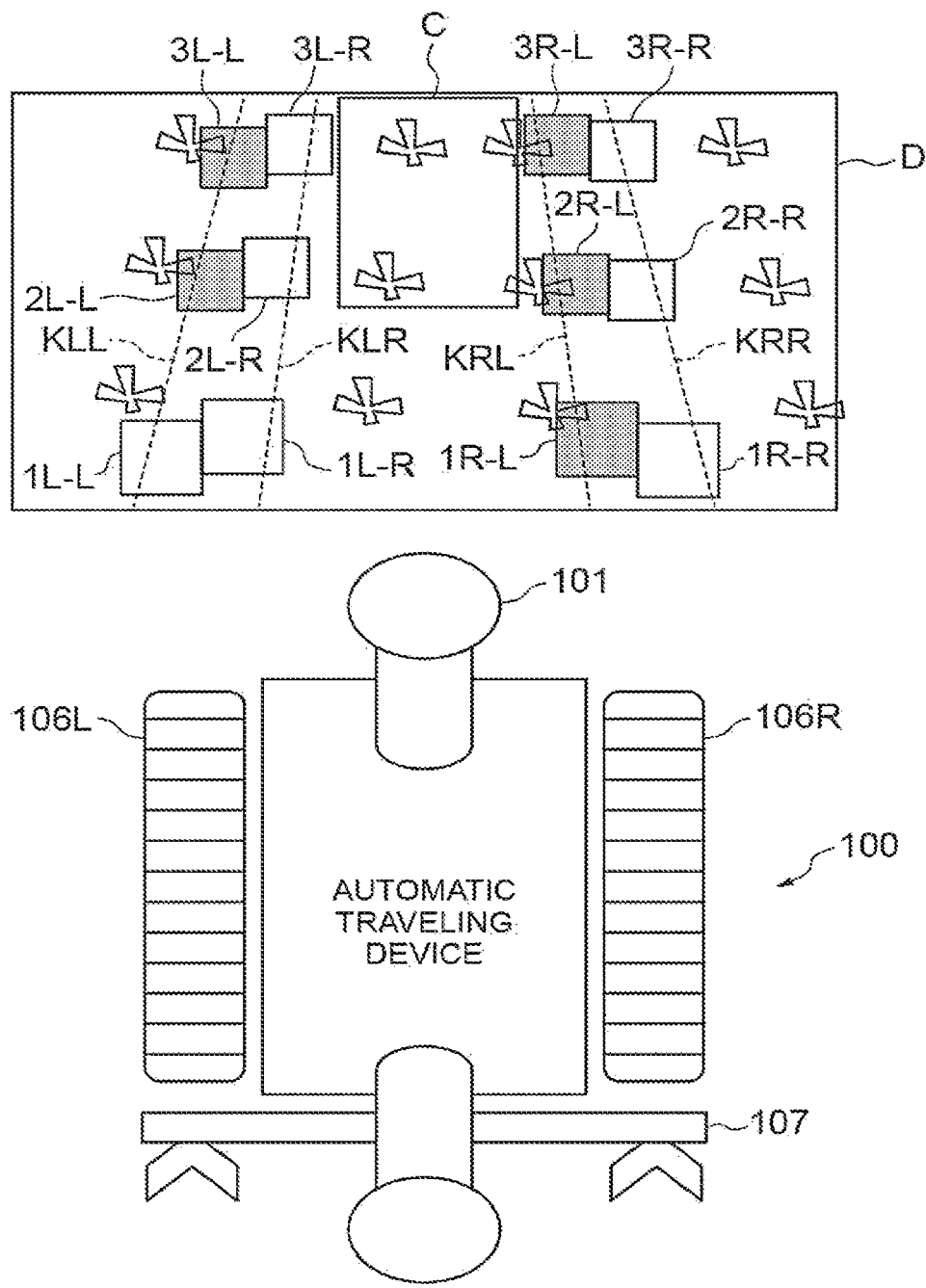
FIG. 6 is a schematic diagram illustrating other image data in which the automatic traveling device 100 is on the track where the crops S are trampled.

Similarly to FIG. 5, FIG. 6 is a schematic diagram illustrating image data in which the automatic traveling device 100 is on a track where the crops S are trampled. In the drawing, the recognition unit 102 recognizes that the crops S overlap the determination window 2L-L, the determination window 3L-L, the determination window 3R-L, and the determination window 2R-L. In addition, the recognition unit 102 recognizes that the crops S are included in the end determination window C. Since the crops S are included in the left determination window 3L-L and the like, the adjustment unit 104 determines that the automatic traveling device 100 is turning to the left, and controls the wheel driving mechanism 106 so that the automatic traveling device rotates in the right direction in order to solve this.

Figure 7:
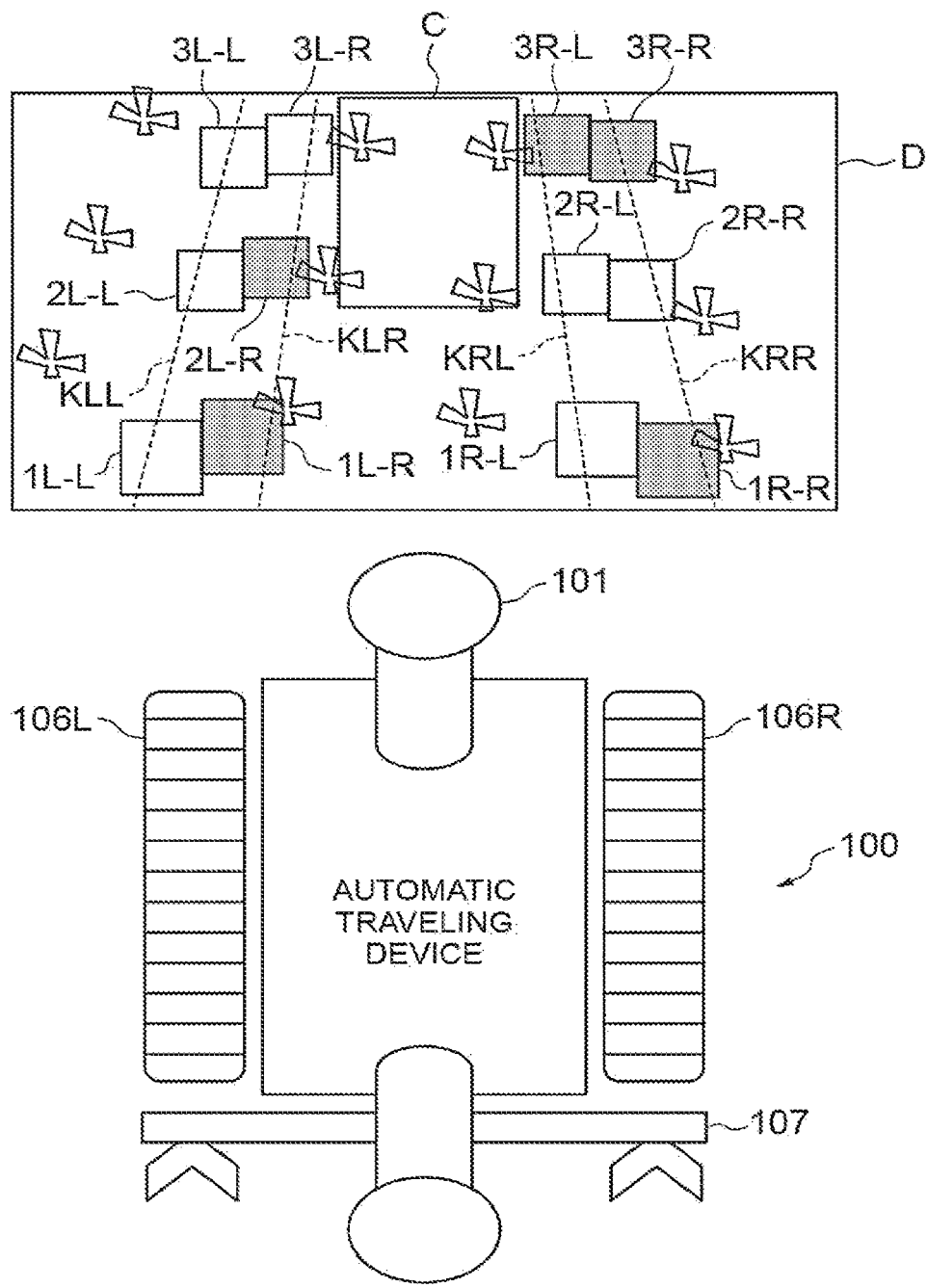
FIG. 7 is a schematic diagram illustrating still other image data in which the automatic traveling device 100 is on the track where the crops S are trampled.

Similarly to FIG. 5, FIG. 7 is a schematic diagram illustrating image data in which the automatic traveling device 100 is on a track where the crops S are trampled. In the drawing, the recognition unit 102 recognizes that the crops S overlap the determination window 1L-R, the determination window 1R-R, the determination window 2L-R, the determination window 3R-L, and the determination window 3R-R. In FIGS. 5 and 6, the crops S are included in either the right or left determination window, but in FIG. 7, the crops S are included in both the right and left determination windows. Since the crops S are included in the right determination window 3R-R and the like, the adjustment unit 104 determines that the automatic traveling device 100 is turning to the right, and controls the wheel driving mechanism 106 so that the automatic traveling device rotates in the left direction in order to solve this.

Detailed processing of the adjustment unit 104 in FIGS. 5 to 7 is as follows. In a case where the number of determination windows including the crops S is equal to or less than a predetermined number, the adjustment unit 104 totalizes (combines) the areas of the right and left determination windows including the crops S, and performs steering control based on the difference. For example, in a case where it is determined that the area of the right determination window is large, the adjustment unit 104 controls the wheel driving mechanism 106 so as to rotate to the left. In that case, rotation control according to a difference in area is performed.

Figure 8:
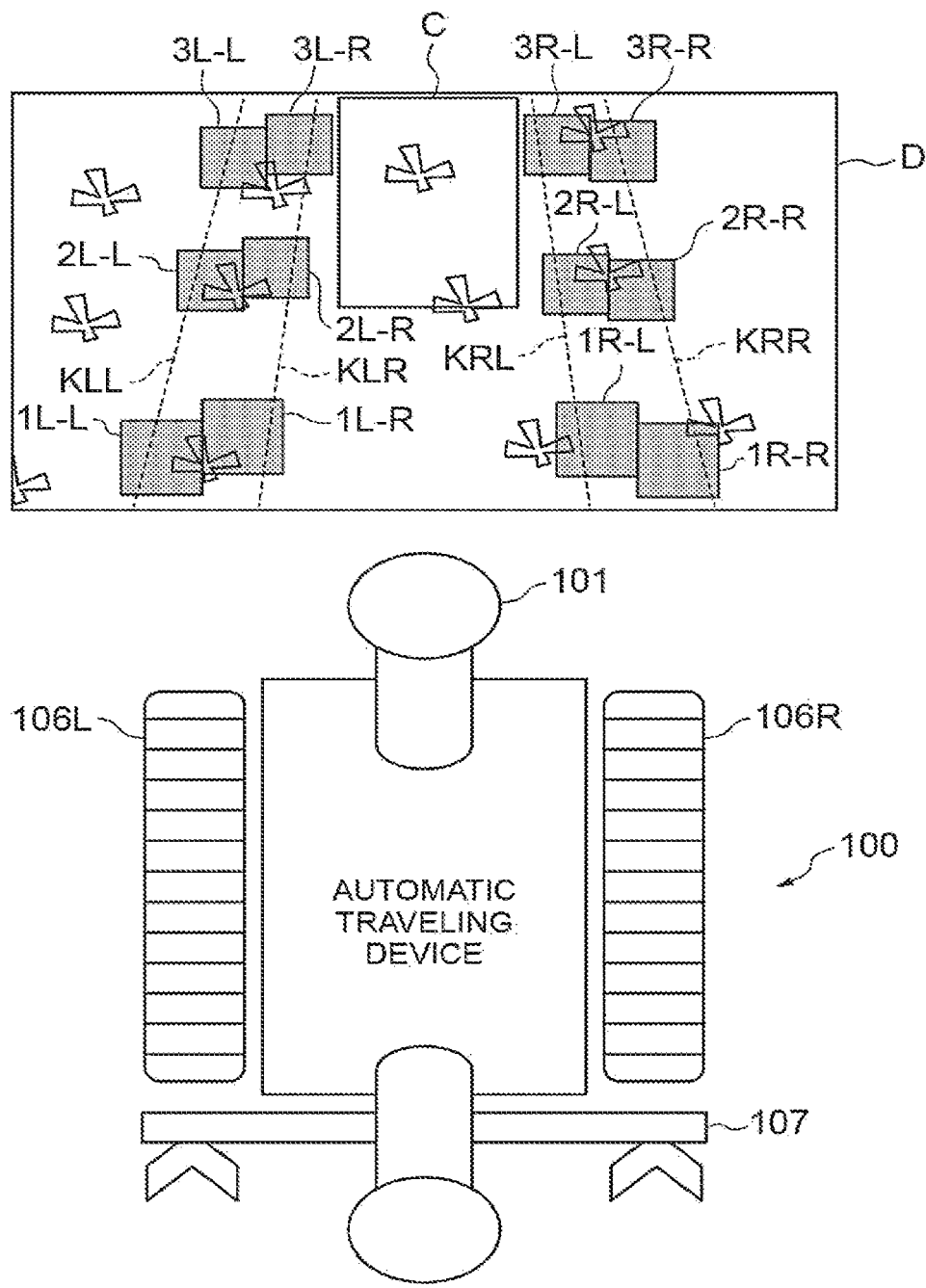
FIG. 8 shows a schematic diagram of the full-screen image data D in an abnormal case.

FIG. 8 shows a schematic diagram of the full-screen image data D in an abnormal case. As shown in the drawing, the recognition unit 102 recognizes that there are the crops S in all of the determination windows 1L-L to 3R-R. In the drawing, the number of determination windows including the crops S is equal to or greater than a predetermined number (for example, twelve) and the area difference between the total area of determination windows nx-L and the total area of determination windows nx-R is 0, but the crops are recognized (n indicates 1 to 3, and x indicates L or R). In this case, the adjustment unit 104 determines that the track of the automatic traveling device 100 is difficult to return to a normal track, and determines that the automatic traveling device is in an abnormal state. The adjustment unit 104 then executes control processing for an abnormal state.

Meanwhile, processing based on the number of determination windows including the crops S may be performed by distinguishing between the right and left in each determination window set. For example, in a case where the number of determination windows 1x-L (x is R or L) including the crops S recognized by the recognition unit 102 and the number of determination windows 1x-R (x is R or L) including the crops S are equal to or greater than a predetermined number, the adjustment unit 104 may determine that the automatic traveling device 100 is in an abnormal state.

Figure 9A:
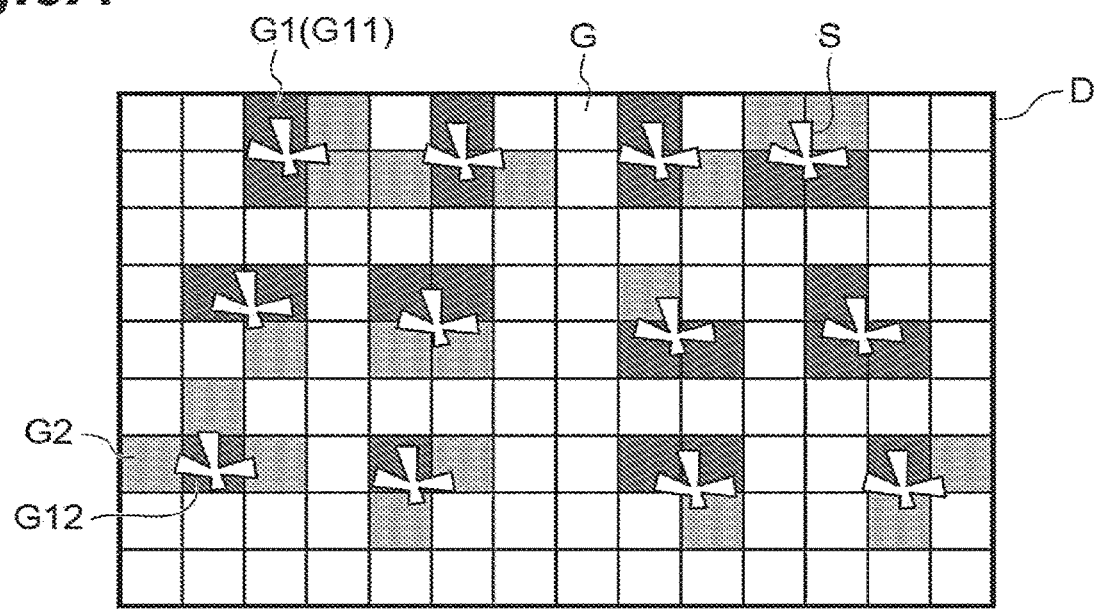
FIGS. 9A and 9B are schematic diagrams illustrating control processing for an abnormal state.
Figure 9B:
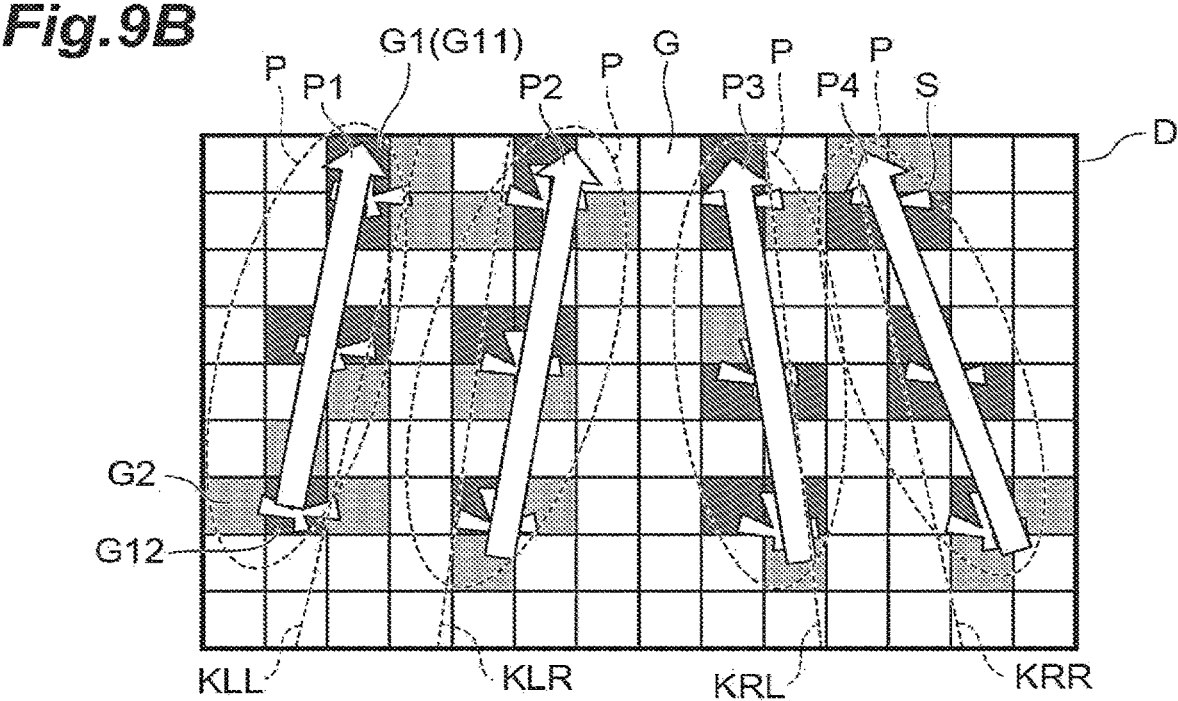

FIGS. 9A and 9B are schematic diagrams illustrating control processing for an abnormal state. As shown in the drawing, when control processing for an abnormal state is performed, the full-screen image data D is divided into predetermined unit with respect to the whole and undergoes a recognition process in the division unit. In FIGS. 9A and 9B, the full-screen image data D is divided into grids G of a predetermined size. Although the size of the grid G is approximately the same as that of the crop S, there is no limitation thereto.

The recognition unit 102 performs a recognition process on an image included in each grid G. In FIG. 9A, among the grids G, a grid G1 indicates a grid G in which the proportion of the image of the crop S is large (equal to or greater than a predetermined area). A grid G2 indicates a grid G in which the proportion of the image of the crop S is small (less than a predetermined area). Meanwhile, the same applies to grids with the same mesh pattern as the grid G1. The same applies to the grid G2.

The recognition unit 102 recognizes the grids G1 and G2 included in the same group in the full-screen image data D. In the present disclosure, division into four groups is performed generally along the reference lines K. This grouping process is performed in accordance with a known clustering process.

In the present disclosure, the recognition unit 102 calculates a straight line direction (inclination) on the basis of the coordinates of the uppermost grid G1 (grid G11) and the lowermost grid G1 (grid G12) in the same group. For example, the recognition unit 102 may calculate the direction on the basis of a known straight line calculation algorithm such as Hough transformation.

Meanwhile, the grid G2 may be used as auxiliary information during calculation of the straight line direction. For example, the straight line direction calculated to pass through a grid G1 group may also be corrected so as to pass through a grid G2 group as much as possible to improve the degree of accuracy.

According to the above-described process, as shown in FIG. 9B, straight lines P1 to P4 are derived. In a case where the average value of the inclinations of the derived straight lines P1 to P4 (for example, the average value when the traveling direction is taken as a reference line) is out of a predetermined range, it may be determined that the automatic traveling device 100 is traveling in a curved direction with respect to the straight traveling direction of the farm field H or is about to travel in a curved direction. The adjustment unit 104 controls the wheel driving mechanism 106 to rotate the automatic traveling device 100 on the spot so as to fall within the range. On the other hand, in a case where the average value of the inclinations of the derived straight lines P1 to P4 is within a predetermined range, it may be determined not to be curved. In that case, the adjustment unit 104 does not perform any control, and the automatic traveling device 100 travels as it is.

Figure 10A:
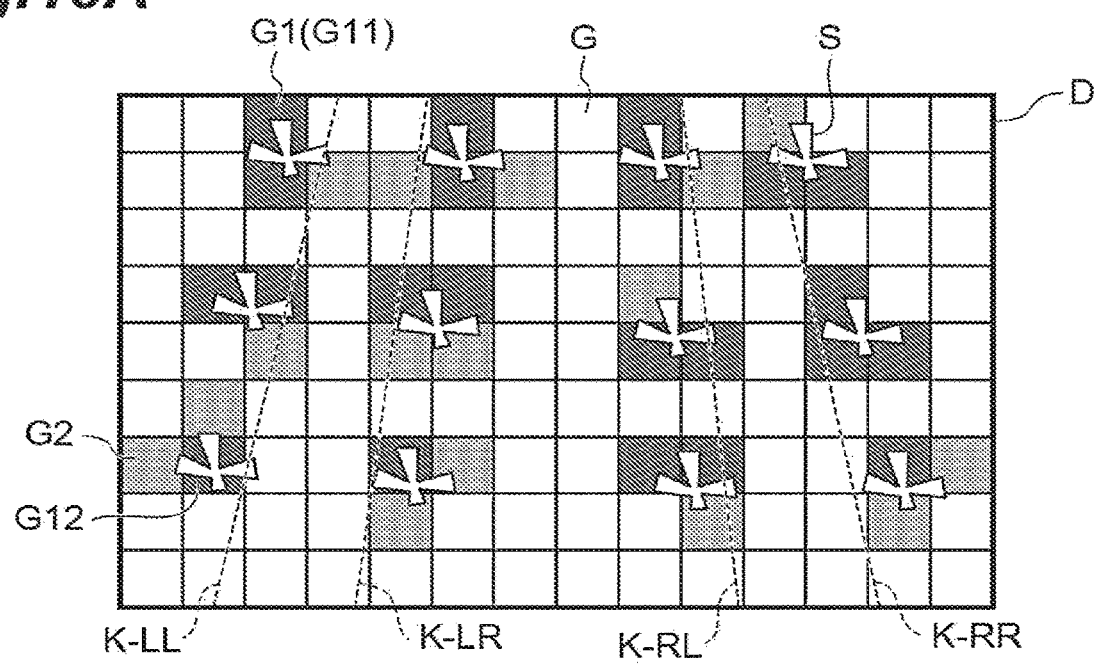
FIGS. 10A and 10B are explanatory diagrams using reference lines K in an abnormal state.
Figure 10B:
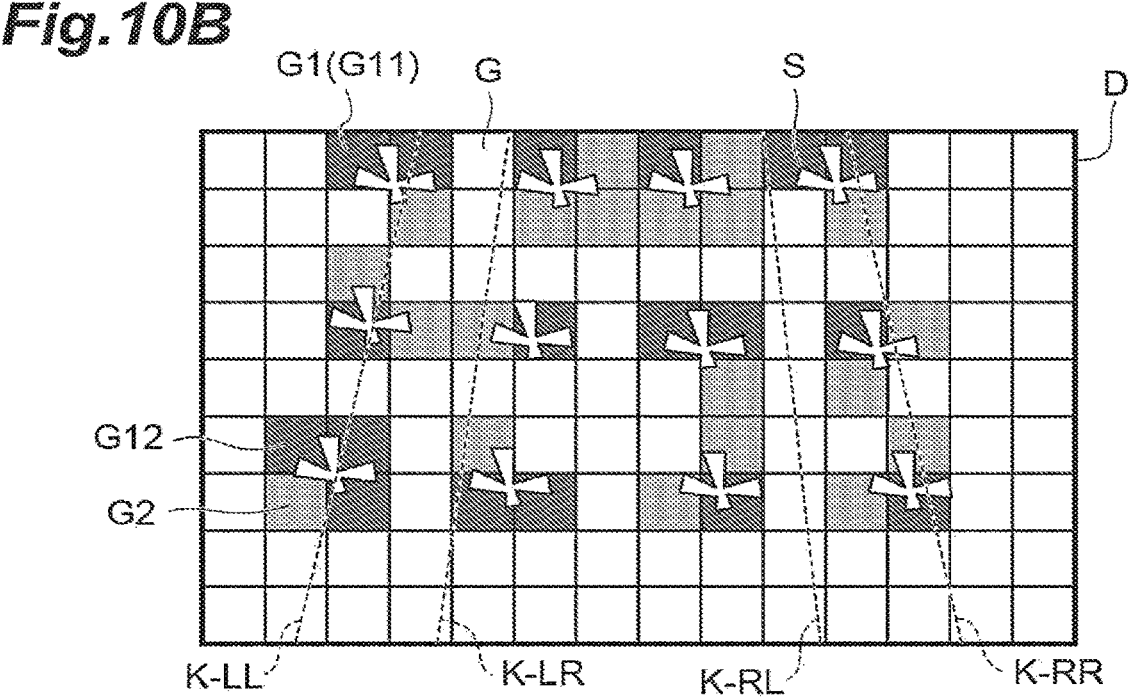

FIGS. 10A and 10B are explanatory diagrams using the reference lines K in an abnormal state. The recognition unit 102 recognizes how many the crops S are included in each grid G and at which positions the crops S are included. The recognition unit 102 recognizes whether there are the crops S between the reference lines K, and the adjustment unit 104 determines whether there are the crops S on the track of the automatic traveling device 100. In FIG. 10A, for example, there are no crops S between the reference line K-LL and the reference line K-LR. Therefore, the adjustment unit 104 determines that the automatic traveling device 100 is in a normal position.

On the other hand, for example, as shown in FIG. 10B, in a case where there are the crops S between the reference line K-LL and the reference line K-LR, the adjustment unit 104 determines that the automatic traveling device 100 is in an abnormal position. In this case, the adjustment unit 104 performs a turning process by changing the steering direction while moving back and forth so that the crops S are not recognized by the recognition unit 102 between the reference lines K.

Hereinafter, in the present disclosure, the processing shown in FIGS. 9A, 9B, 10A and 10B is referred to as a full-screen determination process. Meanwhile, in processing to be described later, the processing using the grids in FIGS. 9A and 9B is performed after the processing using the reference lines K in FIGS. 10A and 10B, but the order may be changed.

Figure 11:
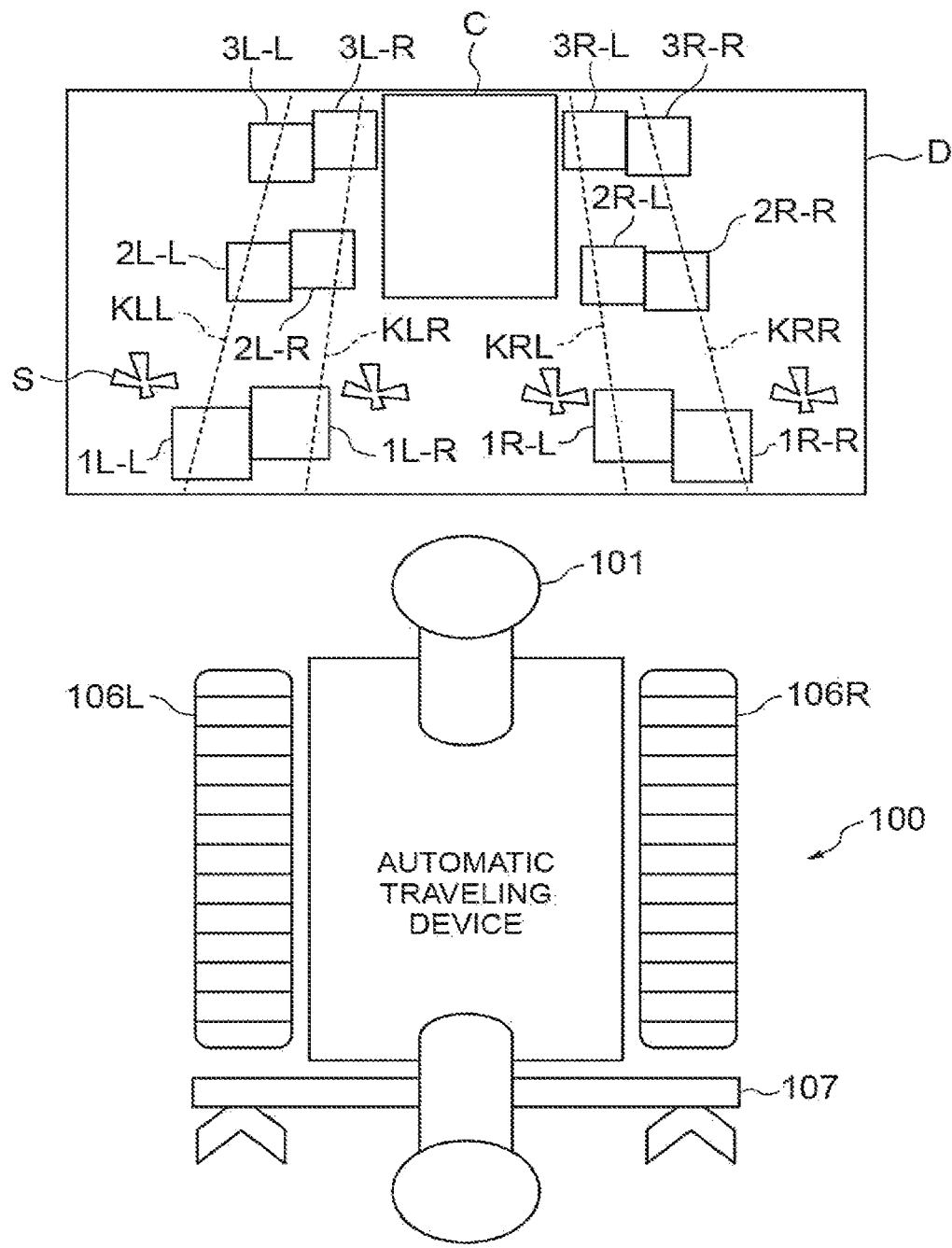
FIG. 11 is a diagram illustrating the full-screen image data D when the automatic traveling device 100 reaches the end of the farm field H.

FIG. 11 is a diagram illustrating the full-screen image data D when the automatic traveling device 100 reaches the end of the farm field H. As shown in the drawing, nothing is recognized in the end determination window C. In this way, in a case where the recognition unit 102 does not recognize the crops S in the end determination window C, it is determined that the automatic traveling device 100 has reached the end of the farm field H. Meanwhile, in a case where the end of the farm field H (such as, for example, the edge) is recognized in the end determination window C, it may be determined that the automatic traveling device has reached the end of the farm field H. In addition, the end of the farm field H may be recognized in the determination window sets 3L and 3R without making a determination in the end determination window C.

The automatic traveling device 100 makes a U-turn in order to perform work on the row of neighboring crops S. After a U-turn and before self-traveling, the automatic traveling device 100 performs the processing shown in FIGS. 9A, 9B, 10A and 10B. Although the processing of FIGS. 9A, 9B, 10A and 10B is processing in an abnormal case of the automatic traveling device 100, the processing of FIGS. 9A, 9B, 10A and 10B may be applied even when the automatic traveling device 100 reaches the end of the farm field H and makes a U-turn.

Figure 12:
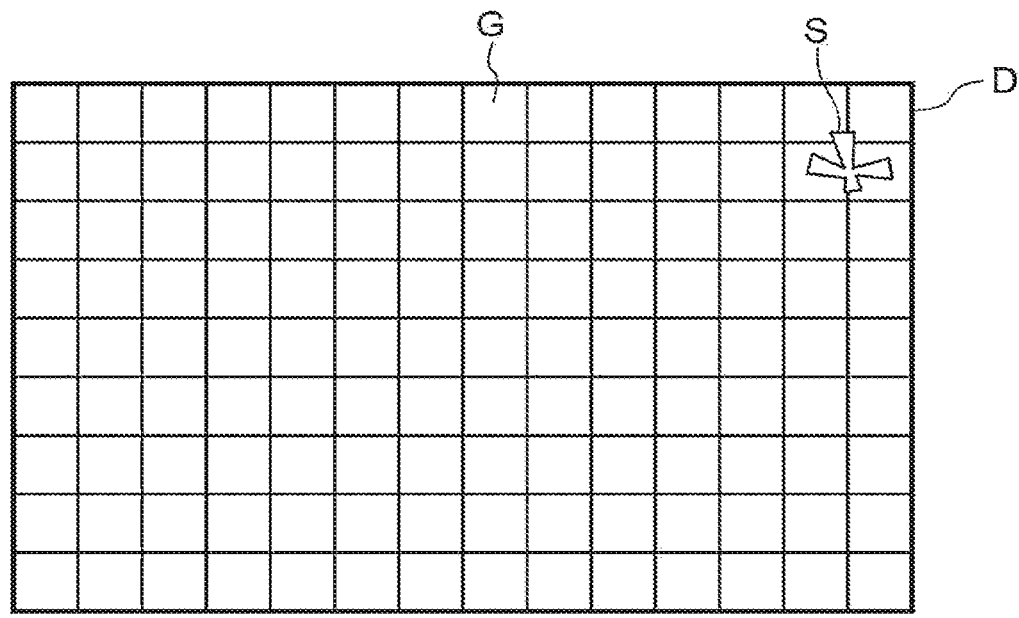
FIG. 12 is a diagram illustrating the full-screen image data D when the automatic traveling device 100 reaches the end of the farm field H and makes a U-turn.

In that case, in a case where the automatic traveling device 100 has traveled through the entire farm field H, the recognition unit 102 performs full-screen image processing shown in FIG. 12. That is, in a case where the recognition unit 102 cannot recognize the crops S within a predetermined range, the adjustment unit 104 determines that the automatic traveling device has traveled through the entire farm field H. In FIG. 12, the crops S are recognized on the upper right side of the full-screen image data D, but it is assumed to be out of the predetermined range.

Figure 13:
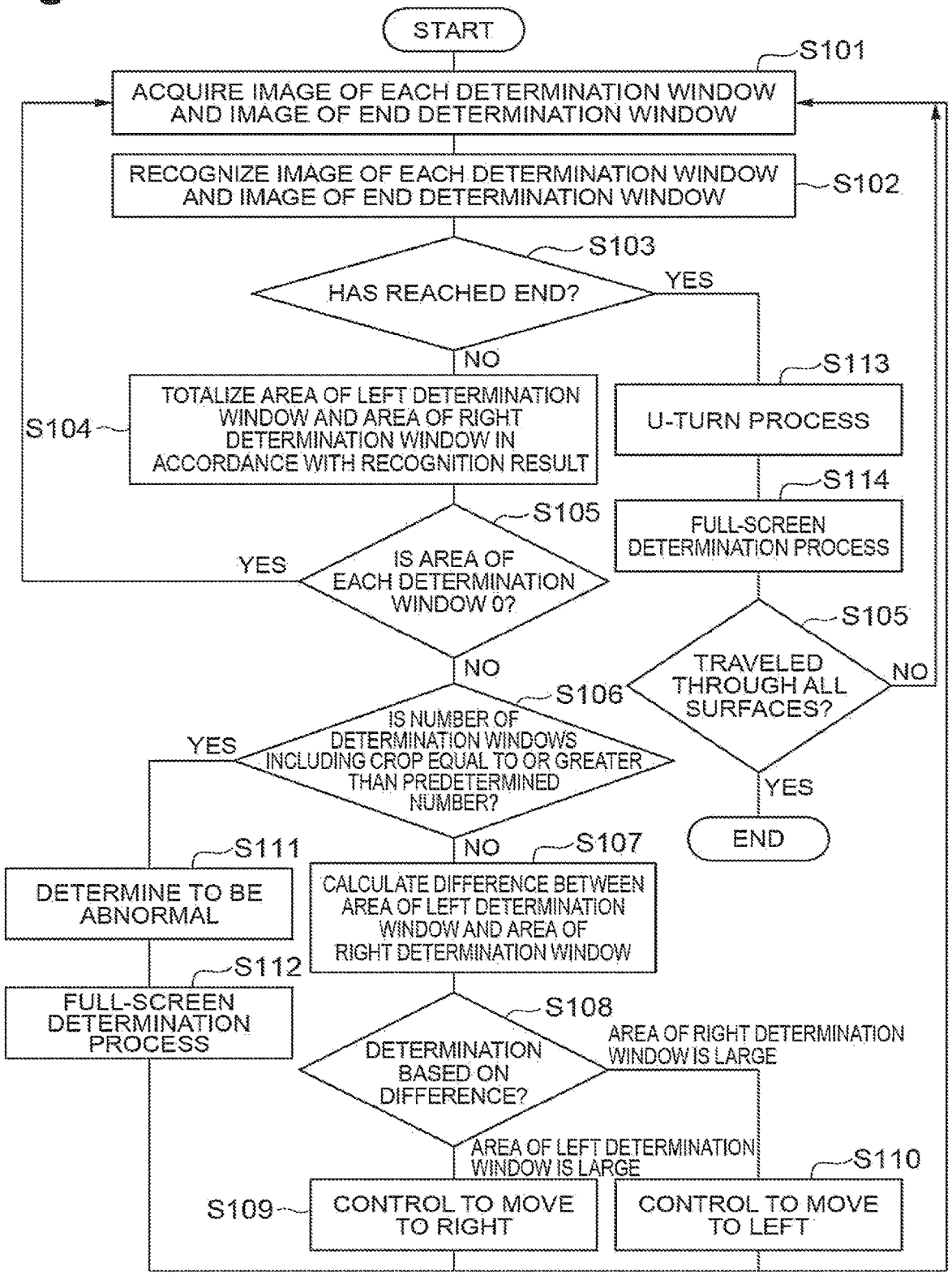
FIG. 13 is a flowchart illustrating a determination process using each determination window while the automatic traveling device 100 is traveling.

Next, the operation of the automatic traveling device 100 of the present disclosure will be described. FIG. 13 is a flowchart illustrating a determination process using each determination window while the automatic traveling device 100 is traveling.

The camera 101 and the recognition unit 102 acquire image data of each determination window 1L-L and the like and image data of the end determination window C (S101). The recognition unit 102 recognizes the image of each determination window 1L-L and the like and the image of the end determination window C (S102). The recognition unit 102 recognizes the crops S in each determination window 1L-L and the like and the end determination window C through known image recognition or the like.

In a case where the recognition unit 102 recognizes the crops S in the end determination window C, the adjustment unit 104 determines that the automatic traveling device 100 has not reached the end of the farm field H (S103: NO). The adjustment unit 104 totalizes the area of the left determination window 1x-L (x is L or R) and the area of the right determination window 1x-R (x is L or R) according to the result of recognition performed by the recognition unit 102 (S104). Meanwhile, the determination window 1x-R indicates the determination windows 1L-R, 2L-R, 3L-R, 1R-R, 2R-R, and 3R-R, and the determination window 1x-L indicates the determination windows 1L-L, 2L-L, 3L-L, 1R-L, 2R-L, and 3R-L. In addition, regardless of the degree of overlap of the crops S, the area of the determination window itself may be totalized, or an area multiplied by a predetermined coefficient on the basis of the degree of overlap of the crops S or the area of a portion recognized as the crop S in the determination window may be obtained, and these areas may be totalized.

In a case where the area of each determination window 1L-L and the like is 0 (S105: YES), the adjustment unit 104 determines to be normal traveling, and the process returns to step S101. In a case where the area of each determination window 1L-L and the like is not 0 (S105: NO), the adjustment unit 104 determines not to be normal traveling.

The adjustment unit 104 determines whether the number of determination windows including the crops S is equal to or greater than a predetermined number (S106). In a case where the number of determination windows is less than the predetermined number (S106: NO), the adjustment unit 104 calculates the difference between the area of the left determination window 1x-L (x is L or R) and the area of the right determination window 1x-R (x is L or R) (S107).

In a case where it is determined that the area of the left determination window 1x-L is large on the basis of the determination result of the recognition unit 102 (S108), the adjustment unit 104 performs control for movement to the right (S109). In the case, the adjustment unit 104 performs control with the amount of steering according to the size of the difference. Meanwhile, the amount of steering according to the size of the area of the left determination window 1x-L may be used.

In addition, in a case where it is determined that the area of the right determination window 1x-R is large (S108), control for movement to the left is performed (S110). In that case, the adjustment unit 104 performs control with the amount of steering according to the size of the difference. Meanwhile, the amount of steering according to the size of the area of the right determination window 1x-R may be used.

In a case where control for movement to the right and left is performed, the process returns to step S101, and the process is repeatedly performed. The control for movement to the right and left may be performed while the automatic traveling device 100 is stopped, or may be performed while the automatic traveling device is moving. In a case where rotation control on the spot is performed, the rotation control may be performed after temporarily stopping when the process of step S106 is performed, and the movement may be started after the termination thereof.

On the other hand, in step S106, in a case where the adjustment unit 104 determines that the number of determination windows including the crops S is equal to or greater than a predetermined number (S106: YES), the adjustment unit 104 determines that the traveling state of the automatic traveling device 100 is abnormal (S111). The abnormal state here indicates that the crops S are on the track of the automatic traveling device 100. In this case, the adjustment unit 104 controls the speed control unit 105 to temporarily stop the automatic traveling device 100. The recognition unit 102 performs the full-screen determination process (S112).

In addition, in step S103, in a case where the adjustment unit 104 determines that the automatic traveling device has reached the end of the farm field H (S103: YES), the adjustment unit 104 controls the wheel driving mechanism 106 to perform a U-turn process (S113). While the automatic traveling device 100 is moving (or may be temporarily stopped), the recognition unit 102 performs the full-screen determination process (S114). In a case where the recognition unit 102 cannot recognize the crops S or the like in the grid in the full-screen determination process, the adjustment unit 104 determines that the automatic traveling device has traveled through the entire farm field H and ends the process.

Figure 14:
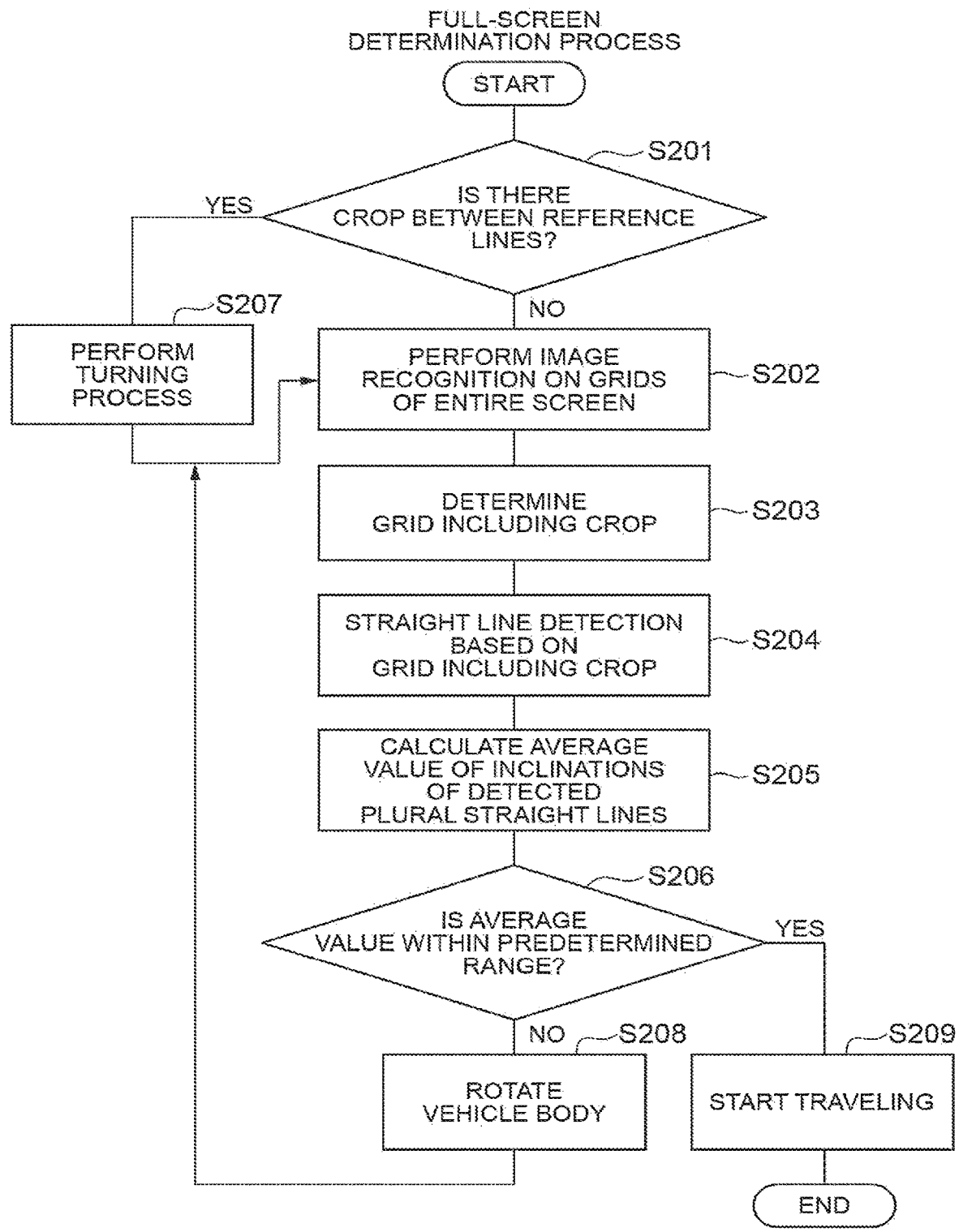
FIG. 14 is a flowchart illustrating processing for a full-screen determination process.

Next, the details of the full-screen determination process will be described. FIG. 14 is a flowchart illustrating the full-screen determination process. First, the recognition unit 102 recognizes whether there are the crops S between the reference lines K (S201). Specifically, the recognition unit 102 recognizes whether there are the crops S between the reference line K-LL and the reference line K-LR and between the reference line K-RL and the reference line K-RR. In a case where the recognition unit 102 recognizes that there are the crops S (S201: YES), the adjustment unit 104 controls the wheel driving mechanism 106 to perform a turning process until the crops S cannot be recognized during that time (S207).

The recognition unit 102 divides the full-screen image data D into grids, and performs image recognition in units of grids (S202). The recognition unit 102 recognizes a grid including the crops S from all the grids of the full-screen image data D (S203). The recognition unit 102 performs a straight line detection process based on the grid including the crops S, and calculates the inclination of each straight line (S204). The recognition unit 102 calculates the average value of the inclinations of the straight lines (S205). The recognition unit 102 determines whether the average value is within a predetermined range (S206). In a case where the recognition unit 102 determines that the average value is not within the predetermined range (S206: NO), the adjustment unit 104 controls the wheel driving mechanism 106 to rotate the automatic traveling device 100 on the spot (S208). In addition, in a case where the recognition unit 102 determines that the average value is within the predetermined range (S206: YES), the adjustment unit 104 controls the wheel driving mechanism 106 to start traveling (S209).

Next, the operational effect of the automatic traveling device 100 of the present disclosure will be described. The automatic traveling device 100 of the present disclosure is a device that performs predetermined work on the crops S which are detection targets arranged in the traveling direction. For example, the crops S are planted in a predetermined direction in the farm field H, and the automatic traveling device 100 performs work such as weeding on the crops S.

The camera 101 captures an image of the crops S in the traveling direction of the automatic traveling device 100 and acquires the full-screen image data D. The recognition unit 102 disposes a plurality of determination windows (such as the determination windows 1L-L and 1L-R) at positions determined in advance with respect to the full-screen image data D, and recognizes the crops S in the plurality of determination windows 1L-L and the like. The adjustment unit 104 adjusts the traveling direction of the automatic traveling device 100 on the basis of the result of recognition performed by the recognition unit 102.

The plurality of determination windows 1L-L and the like are disposed to be shifted from each other along the traveling route of the automatic traveling device 100 according to the imaging range of the camera (the installation direction or angle of view of the camera) that captures an image of the crops S. For example, the plurality of determination windows 1L-L and 1L-R are disposed to be shifted from each other.

According to this disclosure, the traveling direction of the automatic traveling device 100 is determined on the basis of the recognition results in the plurality of determination windows 1L-L and the like, and thus the traveling direction may be adjusted accordingly. Therefore, image recognition enables the steering of traveling without using position information of GPS or the like. In addition, the load in the image recognition process may be reduced by performing image recognition using the plurality of determination windows without performing image recognition on the full screen.

In the present disclosure, for example, in the set of the plurality of determination windows 1L and the like, the determination window set 1L and the like, each set consisting of at least two determination windows 1L-L and 1L-R or the like, are disposed on the right and left of the full-screen image data D. The determination window 1L-L and the determination window 1L-R in the determination window set 1L and the like are disposed to be shifted from each other.

In a set of a plurality of determination windows, for example, the determination window 1L-R and the determination window 1L-L are disposed as the determination window set 1L so as to be close to each other on the right and left.

According to these disclosures, whether the automatic traveling device 100 is traveling inclined to either the right or left may be accurately recognized.

In addition, in the present disclosure, the recognition unit 102 performs the recognition process using at least four sets of determination windows, for example, the determination window sets 1L, 1R, 3L, and 3R. Two determination window sets 1L and 1R out of these four sets of determination windows are disposed on the lower part of the full-screen image data D with each set divided into right and left. The other two determination window sets 3L and 3R are disposed on the upper part of the full-screen image data D with each set divided into right and left.

Meanwhile, there is no limitation thereto, and only at least two determination window sets 1L and 1R may be used. By using the determination window sets 1L and 1R disposed on the lower part of the full-screen image data D, whether the crops S are on a predicted track or not may be accurately determined.

In addition, a set of determination windows may be used under specified conditions. In this case, a set of determination windows is disposed on either the right or left. In a case where the crops S are aligned in an orderly manner and there is not much deviation in the traveling direction, the same effect may also be obtained with a set of determination windows.

In the full-screen image data D, the lower part indicates an area close to the automatic traveling device 100 in the traveling direction, and the upper part indicates an area far from the automatic traveling device 100 in the traveling direction. The traveling direction may be determined on the basis of whether close to or far from the automatic traveling device 100. In addition, robustness against loss of the crops S may be enhanced by using the four sets of determination windows 1L and the like. Thus, accurate steering may be done.

Here, the two determination window sets 3L and 3R disposed on the upper part of the full-screen image data D among these four determination window sets 1L, 1R, 3L, and 3R are formed to be smaller than the two determination window sets 1L and 1R disposed on the lower part of the full-screen image data.

The front side (lower part of the full-screen image data) is more important than the back side (upper part) because it needs to reflect the recognition result more quickly. Therefore, accurate steering may be done by forming a large determination window on the front side (lower part). In addition, in the present disclosure, the adjustment unit 104 adjusts the traveling direction on the basis of the area of the determination window 1L-L and the like including the crops S. As described above, the area of the determination window set 1L and the like differs depending on the arrangement position. The traveling direction may be accurately adjusted by changing the amount of steering in accordance with the area of a determination window including the crops S. In a case where the crops S are included in most of a certain determination window, it may be considered that the traveling direction of the automatic traveling device 100 is greatly inaccurate. Therefore, the traveling direction which is greatly inaccurate may be corrected by changing the traveling direction with a large amount of steering.

The end determination window C in the present disclosure is disposed on the upper part of the full-screen image data D. The recognition unit 102 determines the end of the arrangement of the crops S on the basis of the image included in the end determination window C.

The end of the farm field H may be determined by using this end determination window C.

Here, in a case where the automatic traveling device 100 is under a predetermined condition, the recognition unit 102 recognizes which of grids G includes the crops S by using the grids G which are division determination windows obtained by dividing the full screen of the full-screen image data into predetermined units. The adjustment unit 104 adjusts the traveling direction on the basis of the recognition.

In this way, by switching from a determination method using the set of a plurality of determination windows 1L and the like to a full-screen determination method in accordance with a predetermined condition, accurate recognition is performed without using the set of a plurality of determination windows 1L and the like. Here, a case where the automatic traveling device 100 is under a predetermined condition is a case where the adjustment unit 104 determines that adjustment is impossible on the basis of the result of recognition performed by the recognition unit 102. For example, in a case where the crops S are recognized in the plurality of determination windows 1L-L and the like, it may be considered that the automatic traveling device 100 is traveling in a greatly inaccurate direction. In this case, it is difficult to make a correct determination in recognition using the set of a plurality of determination windows 1L and the like.

In addition, a case where the automatic traveling device 100 is under a predetermined condition is a case where the traveling direction of the automatic traveling device 100 is changed beyond a predetermined range. For example, this is a case or the like where the automatic traveling device 100 reaches the end of the farm field H and makes a U-turn. In this case, the traveling direction may be accurately adjusted by performing the full-screen determination process.

The block diagram used for the description of the above embodiments shows blocks of functions. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

Figure 15:
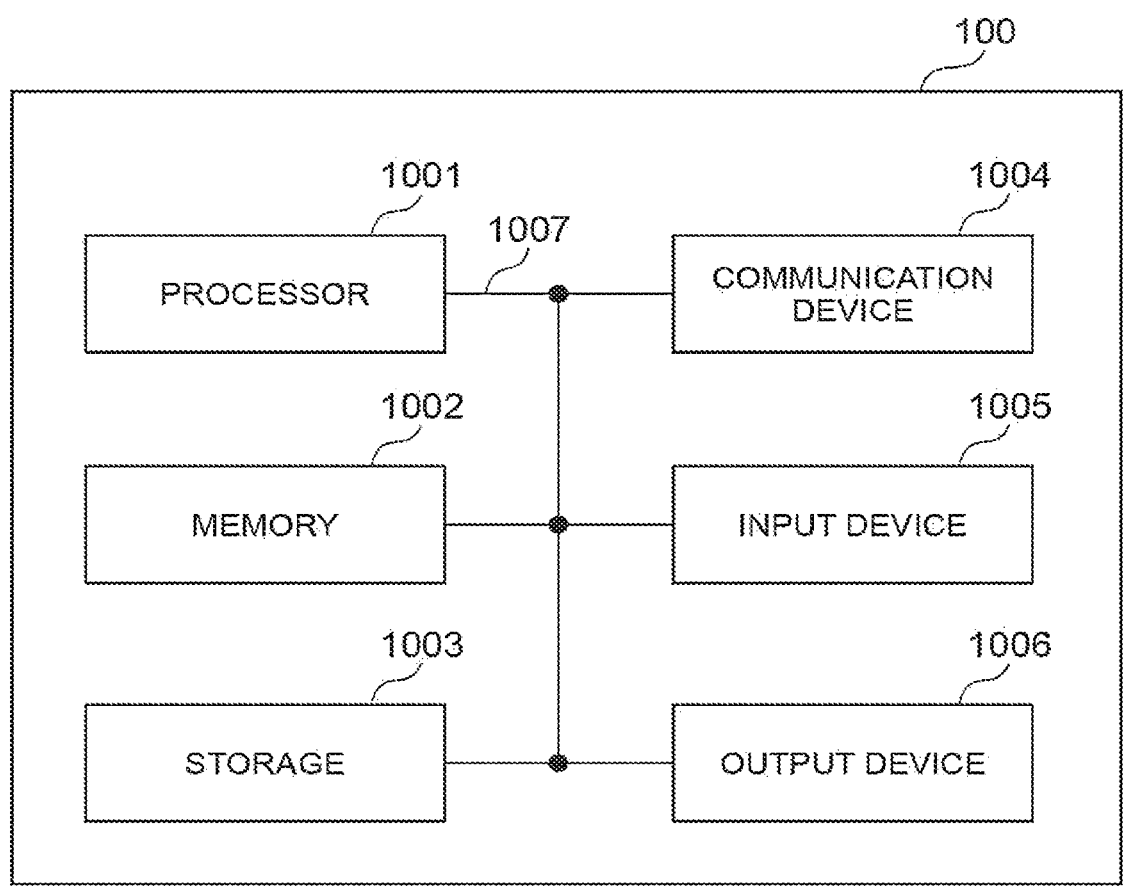
FIG. 15 is a diagram illustrating an example of a hardware configuration in a control portion of the automatic traveling device 100 according to an embodiment of the present disclosure.

For example, the automatic traveling device 100 according to one embodiment of the present disclosure may function as a computer that performs processing of an automatic traveling method according to the present disclosure. FIG. 15 is a view showing an example of the hardware configuration of control part (from the recognition unit 102 to the speed control unit 105) of the automatic traveling device 100 according to one embodiment of the present disclosure. The control part of the automatic traveling device 100 described above may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the control part of the automatic traveling device 100 may be configured to include one or a plurality of the devices shown in the drawings or may be configured without including some of those devices.

The functions of the control part of the automatic traveling device 100 may be implemented by loading predetermined software (programs) on hardware such as the processor 1001 and the memory 1002, so that the processor 1001 performs computations to control communications by the communication device 1004 and control at least one of reading and writing of data in the memory 1002 and the storage 1003.

The processor 1001 may, for example, operate an operating system to control the entire computer. The processor 1001 may be configured to include a CPU (Central Processing Unit) including an interface with a peripheral device, a control device, an arithmetic device, a register and the like. For example, the recognition unit 102 described above may be implemented by the processor 1001.

Further, the processor 1001 loads a program (program code), a software module and data from at least one of the storage 1003 and the communication device 1004 into the memory 1002 and performs various processing according to them. As the program, a program that causes a computer to execute at least some of the operations described in the above embodiments is used. For example, the recognition unit 102 in the automatic traveling device 100 may be implemented by a control program that is stored in the memory 1002 and operates on the processor 1001, and the other functional blocks may be implemented in the same way. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (ErasableProgrammable ROM), EEPROM (Electrically ErasableProgrammable ROM), RAM (Random Access Memory) and the like, for example. The memory 1002 may be also called a register, a cache, a main memory (main storage device) or the like. The memory 1002 can store a program (program code), a software module and the like that can be executed for implementing an automatic traveling method according to one embodiment of the present disclosure.

The storage 1003 is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, a magnetic strip and the like, for example. The storage 1003 may be called an auxiliary storage device. The above-described storage medium may be a database, a server, or another appropriate medium including the memory 1002 and/or the storage 1003, for example.

The communication device 1004 is hardware (a transmitting and receiving device) for performing communication between computers via at least one of a wired network and a wireless network, and it may also be referred to as a network device, a network controller, a network card, a communication module, or the like. The communication device 1004 may include a high-frequency switch, a duplexer, a filter, a frequency synthesizer or the like in order to implement at least one of FDD (Frequency Division Duplex) and TDD (Time Division Duplex), for example. Meanwhile, the automatic traveling device 100 of the present disclosure does not require a communication device, but may be provided with a communication device as described above in order to perform control from the outside.

The input device 1005 is an input device (e.g., a keyboard, a mouse, a microphone, a switch, a button, a sensor, etc.) that receives an input from the outside. The output device 1006 is an output device (e.g., a display, a speaker, an LED lamp, etc.) that makes output to the outside. Note that the input device 1005 and the output device 1006 may be integrated (e.g., a touch panel).

In addition, the devices such as the processor 1001 and the memory 1002 are connected by the bus 1007 for communicating information. The bus 1007 may be a single bus or may be composed of different buses between different devices.

Further, the automatic traveling device 100 may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001 may be implemented with at least one of these hardware components.

The procedure, the sequence, the flowchart and the like in each of the aspects/embodiments described in the present disclosure may be in a different order unless inconsistency arises. For example, for the method described in the present disclosure, elements of various steps are described in an exemplified order, and it is not limited to the specific order described above.

Input/output information or the like may be stored in a specific location (e.g., memory) or managed in a management table. Further, input/output information or the like can be overwritten or updated, or additional data can be written. Output information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each of the aspects/embodiments described in the present disclosure may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiments described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure.

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using at least one of wired technology (a coaxial cable, an optical fiber cable, a twisted pair and a digital subscriber line (DSL) etc.) and wireless technology (infrared rays, microwave etc.), at least one of those wired technology and wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term "determining" and "determining" used in the present disclosure includes a variety of operations. For example, "determining" and "determining" can include regarding the act of judging, calculating, computing, processing, deriving, investigating, looking up/searching/inquiring (e.g., looking up in a table, a database or another data structure), ascertaining or the like as being "determined" and "determined". Further, "determining" and "determining" can include regarding the act of receiving (e.g., receiving information), transmitting (e.g., transmitting information), inputting, outputting, accessing (e.g., accessing data in a memory) or the like as being "determined" and "determined". Further, "determining" and "determining" can include regarding the act of resolving, selecting, choosing, establishing, comparing or the like as being "determined" and "determined". In other words, "determining" and "determining" can include regarding a certain operation as being "determined" and "determined". Further, "determining (determining)" may be replaced with "assuming", "expecting", "considering" and the like.

The description "on the basis of" used in the present disclosure does not mean "only on the basis of" unless otherwise noted. In other words, the description "on the basis of" means both of "only on the basis of" and "at least on the basis of".

As long as "include", "including" and transformation of them are used in the present disclosure, those terms are intended to be comprehensive like the term "comprising". Further, the term "or" used in the present disclosure is intended not to be exclusive OR.

In the present disclosure, when articles, such as "a", "an", and "the" in English, for example, are added by translation, the present disclosure may include that nouns following such articles are plural.

In the present disclosure, the term "A and B are different" may mean that "A and B are different from each other". Note that this term may mean that "A and B are different from C". The terms such as "separated" and "coupled" may be also interpreted in the same manner.

REFERENCE SIGNS LIST

100 Automatic traveling device
101 Camera
102 Recognition unit
104 Adjustment unit
105 Speed control unit
105 Speed control unit
106 Wheel driving mechanism
107 Working unit

The invention claimed is:
1. A self-driving vehicle configured to perform a predetermined work on detection targets arranged in a traveling direction of the self-driving vehicle, the self-driving vehicle comprising:

a camera configured to capture an image of a detection target in the traveling direction to acquire image data; and at least one processor configured to:
dispose a plurality of determination windows at predetermined positions with respect to the image data;
recognize the detection target in the determination windows, wherein the determination windows are disposed to be out of alignment from each other in accordance with an imaging range of the camera; and
adjust the traveling direction based on a recognition result of the detection target in the determination windows.

2. The self-driving vehicle according to claim 1,
wherein the self-driving vehicle is a farm vehicle configured to travel through a farm field according to the traveling direction, and to perform a predetermined farm operation, and the detection targets are crops in the farm field.

3. The self-driving vehicle according to claim 1,
wherein a plurality of sets of determination windows, each set comprising at least two determination windows, are disposed on a left side of the image data and a right side of the image data, and
wherein the at least two determination windows in a set of the determination windows are disposed to be out of alignment from each other.

4. The self-driving vehicle according to claim 3,
wherein the at least two determination windows are disposed so as to be located next to each other horizontally from left to right as the set of determination windows.

5. The self-driving vehicle according to claim 4,
wherein the at least two determination windows are disposed so as to abut each other.

6. The self-driving vehicle according to claim 3,
wherein the at least two determination windows in a set of the determination windows are disposed along a reference line so as to be out of alignment from each other, and wherein the reference line indicates a track prediction of the self-driving vehicle.

7. The self-driving vehicle according to claim 1,
wherein at least four sets of determination windows are used to recognize the detection target,
wherein a first set and a second set of the at least four sets of determination windows are disposed on a lower part of the image data, the first set being disposed on a lower left side of the image data and the second set being disposed on a lower right side of the image data, and
wherein a third set and a fourth set of the at least four sets of determination windows are disposed on an upper part of the image data, the third set being disposed on an upper left side of the image data and the fourth set being disposed on an upper right side of the image data.

8. The self-driving vehicle according to claim 7,
wherein determination windows in the third set and the fourth set are smaller than determination windows in the first set and the second set.

9. The self-driving vehicle according to claim 1,
wherein the traveling direction is adjusted based on an area of a determination window including the detection target.

10. The self-driving vehicle according to claim 9,
wherein, in response to determining that a number of determination windows including the detection target is less than a predetermined number, the processor is configured to:
combine areas of determination windows disposed on a left side of the image data and including the detection target to determine a first area, and areas of determination windows disposed on a right side of the image data and including the detection target to determine a second area; and
adjust the traveling direction based on a difference of the first area and the second area.

11. The self-driving vehicle according to claim 1,
wherein an end determination window is disposed on an upper part of the image data, and
wherein an end of an arrangement of the detection targets are recognized based on an image included in the end determination window.

12. The self-driving vehicle according to claim 1,
wherein, in response to determining that the self-driving vehicle is under a predetermined condition, the processor is configured to use division determination windows obtained by dividing a full screen of the image data into predetermined units to identify a division determination window among the division determination windows, that includes the detection target, and
wherein the traveling direction is adjusted based on the identified division determination window that includes the detection target.

13. The self-driving vehicle according to claim 12,
wherein the division determination window and the detection target are approximately equal in size.

14. The self-driving vehicle according to claim 12,
wherein the processor is configured to:
identify one or more of the division determination windows including the detection target;
divide the one or more division determination windows including the detection target into a plurality of groups arranged along a reference line, wherein the reference line indicates a track prediction of the self-driving vehicle; and
calculate an inclination of a line formed by an uppermost division determination window and a lowermost division determination window in each group of the plurality of groups, and
wherein the traveling direction is adjusted based on the calculated inclination.

15. The self-driving vehicle according to claim 12,
wherein the predetermined condition indicates that the recognition result of the detection target in the determination window is incompatible with adjusting the traveling direction.

16. The self-driving vehicle according to claim 15,
wherein the predetermined condition indicates that a number of determination windows including the detection target is greater than a first predetermined number, and a difference between areas of determination windows disposed on a left side of the image data and including the detection target and areas of determination windows disposed on a right side of the image data and including the detection target is less than a second predetermined number.

17. The self-driving vehicle according to claim 12,
wherein the predetermined condition indicates that the traveling direction is changed beyond a predetermined range.

18. The self-driving vehicle according to claim 17,
wherein the predetermined condition indicates that the self-driving vehicle reaches an end of a farm field and makes a U-turn.

19. A self-driving vehicle configured to perform a predetermined work on detection targets arranged in a traveling direction of the self-driving vehicle, the self-driving vehicle comprising:
- an acquisition unit configured to capture an image of a detection target in the traveling direction to acquire image data;
- a recognition unit configured to dispose a plurality of determination windows at predetermined positions with respect to the image data and recognize the detection target in the determination windows, wherein the determination windows are disposed to be out of alignment from each other in accordance with an imaging range of the acquisition unit; and
- an adjustment unit configured to adjust the traveling direction based on a recognition result from the recognition unit.

20. A processing device for a self-driving vehicle, the processing device comprising circuitry configured to:
- receive image data from a camera;
- dispose a plurality of determination windows at predetermined positions with respect to the image data and recognize a detection target in the determination windows, wherein the determination windows are disposed to be out of alignment from each other in accordance with an imaging range of the camera; and
- adjust a traveling direction of the self-driving vehicle based on a recognition result of the
- detection target in the determination windows.

* * * * *